United States Patent

Ryan

(10) Patent No.: US 6,669,231 B2
(45) Date of Patent: Dec. 30, 2003

(54) ADAPTIVE VENTING FOR AN AIR BAG MODULE

(75) Inventor: Shawn Gregory Ryan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/185,804

(22) Filed: Nov. 4, 1998

(65) Prior Publication Data

US 2001/0038201 A1 Nov. 8, 2001

(51) Int. Cl.[7] .............................................. B60R 21/26
(52) U.S. Cl. ...................................... 280/736; 280/739
(58) Field of Search .............................. 280/728.1, 736, 280/742, 739, 738, 740

(56) References Cited

U.S. PATENT DOCUMENTS

| | | | |
|---|---|---|---|
| 3,861,712 A | | 1/1975 | Matsui et al. |
| 3,937,258 A | * | 2/1976 | Loomba ...................... 141/67 |
| 5,221,109 A | | 6/1993 | Marchant |
| 5,280,953 A | * | 1/1994 | Wolanin et al. ............. 280/739 |
| 5,330,226 A | | 7/1994 | Gentry et al. |
| 5,366,242 A | | 11/1994 | Faigle et al. |
| 5,413,378 A | | 5/1995 | Steffens, Jr. et al. |
| 5,566,976 A | * | 10/1996 | Cuevas ........................ 280/737 |
| 5,664,802 A | | 9/1997 | Harris et al. |
| 5,695,214 A | | 12/1997 | Faigle et al. |
| 5,707,078 A | | 1/1998 | Swanberg et al. |
| 5,709,405 A | | 1/1998 | Saderholm et al. |
| 5,853,192 A | * | 12/1998 | Sikorski et al. ............. 280/739 |
| 5,918,901 A | * | 7/1999 | Johnson et al. ............. 280/739 |
| 5,927,753 A | * | 7/1999 | Faigle et al. ................ 280/735 |
| 5,947,514 A | * | 9/1999 | Keller et al. ................ 280/742 |
| 5,984,352 A | * | 11/1999 | Green, Jr. et al. .......... 280/736 |
| 6,039,346 A | * | 3/2000 | Ryan et al. .................. 280/736 |
| 6,039,347 A | * | 3/2000 | Maynard ..................... 280/736 |

FOREIGN PATENT DOCUMENTS

| | | |
|---|---|---|
| DE | 19704601 | 8/1997 |
| EP | 800967 | 10/1997 |
| JP | 3-32957 | 2/1991 |

\* cited by examiner

*Primary Examiner*—Peter C. English
(74) *Attorney, Agent, or Firm*—Scott A. McBain

(57) ABSTRACT

An air bag module is provided for inflating an air bag cushion at dual rates in response to rapid deceleration of a motor vehicle. The air bag module includes an air bag housing for receiving an inflator. The air bag cushion is secured to a peripheral flange of the housing in a folded position. Upon actuation of the inflator, heated gas passes selectively from the inflator through a plurality of openings in the housing. A controller generates an ignition signal to the inflator in response to velocity responsive sensors. In response to the ignition signals, the inflator releases an appropriate predetermined volume of gas into the air bag cushion. The level of deployment or inflation of the air bag cushion is dependent on the actuation of a slide slidably arranged to selectively block the openings of the air bag housing to restrict gas flow to the air bag cushion. The housing further includes venting apertures to permit gas flow from the housing and thereby redirect the gas away from the air bag cushion.

36 Claims, 4 Drawing Sheets

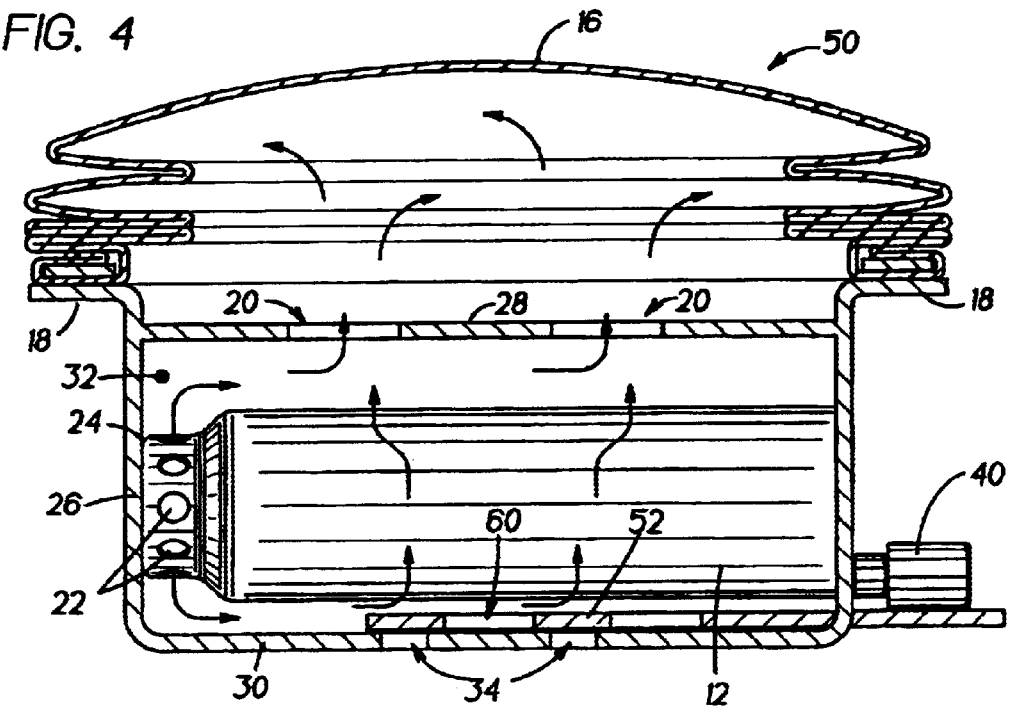
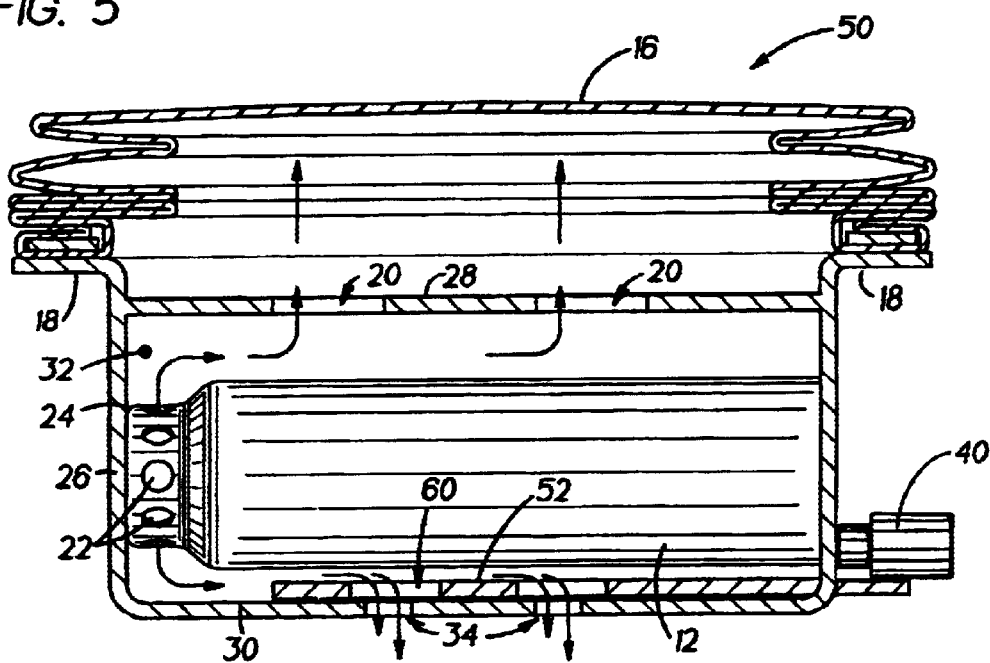

ADAPTIVE VENTING FOR AN AIR BAG MODULE

TECHNICAL FIELD

The present invention relates generally to vehicle supplemental inflatable restraint systems and, more particularly, to an air bag module that provides variable output inflation of an air bag cushion from a single inflator.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag cushions are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gases flow through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

It is also known to inflate the cushion at a relatively low rate under low level deployment conditions, such as a sudden low level deceleration, and at a relatively high rate under high level deployment conditions, such as a sudden high level deceleration. This can be accomplished in a pure gas type inflator by providing the pressure vessel with an outlet of variable flow area. In addition, devices are known which provide primary inflation (reduced inflation) and full level inflation using a single gas vessel with two separate gas heaters. Primary inflation is accomplished by actuating the gas vessel and heating the gas at a specified reduced level. Full level inflation is accomplished by actuating a second separate heater located at the bottom of the gas vessel to heat the gas at a greater level. This second heater is deployed at the same time or a delayed time as the primary heater to provide full level inflation.

It is also known in the art to use a system having two discrete inflators to accomplish dual level inflation. In these types of systems, two discrete inflators are deployed at the same time or at a delayed time depending upon the severity of the sudden deceleration.

SUMMARY OF THE INVENTION

This invention offers advantages and alternatives over the prior art by providing an air bag module having a slide for selectively restricting the gas flow passing from an inflation chamber to an air bag cushion to provide different levels of air bag deployment. Advantageously, the housing of the air bag module includes openings to permit gas flow to the air bag cushion and venting apertures for providing a path directing gas flow away from the air bag cushion to reduce the level of deployment. The slide may selectively restrict the gas flowing into the air bag chamber through the openings of the housing, or selectively restrict the gas exiting the chamber through the venting apertures of the housing to provide a simple means of varying the level of deployment of the air bag cushion. Furthermore, another embodiment including a flap disposed in the housing provides an economic means of providing dual inflation of the air bag cushion by selectively diverting gas from the air bag cushion under reduced level deployment conditions.

These and other advantages are accomplished in a preferred form of the invention by providing an air bag module that provides dual inflation levels of an air bag cushion in response to rapid deceleration of a vehicle. The air bag module has a housing that defines a chamber. A vent aperture disposed in the housing provides fluid communication between the chamber and exterior of the housing. The air bag cushion is secured to the housing in fluid communication with the chamber through first openings disposed in the housing. An inflator releases gas to inflate the air bag cushion in response to one of a first and second deployment conditions. An actuator moves a slide from a first position to a second position in response to the first deployment condition. The first position permits a first predetermined level of fluid communication between said chamber and air bag cushion and the second position permits a second predetermined level of fluid communication between the chamber and air bag cushion. The first predetermined level of fluid communication is different than the second predetermined level.

In accordance with another embodiment of the invention, an air bag module has a housing that defines a chamber. The air bag cushion is secured to the housing in fluid communication with the chamber through first openings disposed in the housing. An inflator releases gas to inflate the air bag cushion in response to one of a first and second deployment conditions. A vent aperture disposed in the housing provides selective fluid communication between the chamber and exterior of the housing. The vent aperture provides a first level of fluid communication under the first level deployment condition, and a second level of fluid communication under the second level deployment condition.

In accordance with other preferred aspects of the other embodiment of the invention, the air bag module further includes an actuator that moves a slide from a first position to a second position in response to the first level deployment condition. The first position permits a first predetermined level of fluid communication between the chamber and exterior of the housing, and the second position permits a second predetermined level of fluid communication between the chamber and the exterior of the housing. The first predetermined level of fluid communication is different than the second level of fluid communication.

In addition, the venting aperture maybe a deformable flap disposed in the housing of the air bag module. An actuator includes a stop disposed adjacent the flap that moves between an extended position to prevent the opening of the flap under full level deployment condition and a retracted position to permit the opening of the flap during reduced level deployment condition.

BRIEF DESCRIPTION OF THE DRAWINGS

The present invention will now be described, by way of example only, with reference to the accompanying drawings in which:

FIG. 4 is a sectional view of an alternative embodiment of a passenger's side air bag module embodying the present invention shown during full deployment of an air bag cushion;

FIG. 5 is a sectional view of the passenger's side air bag module of FIG. 4 shown during reduced deployment of the air bag cushion;

DETAILED DESCRIPTION OF THE INVENTION

Figure 1:
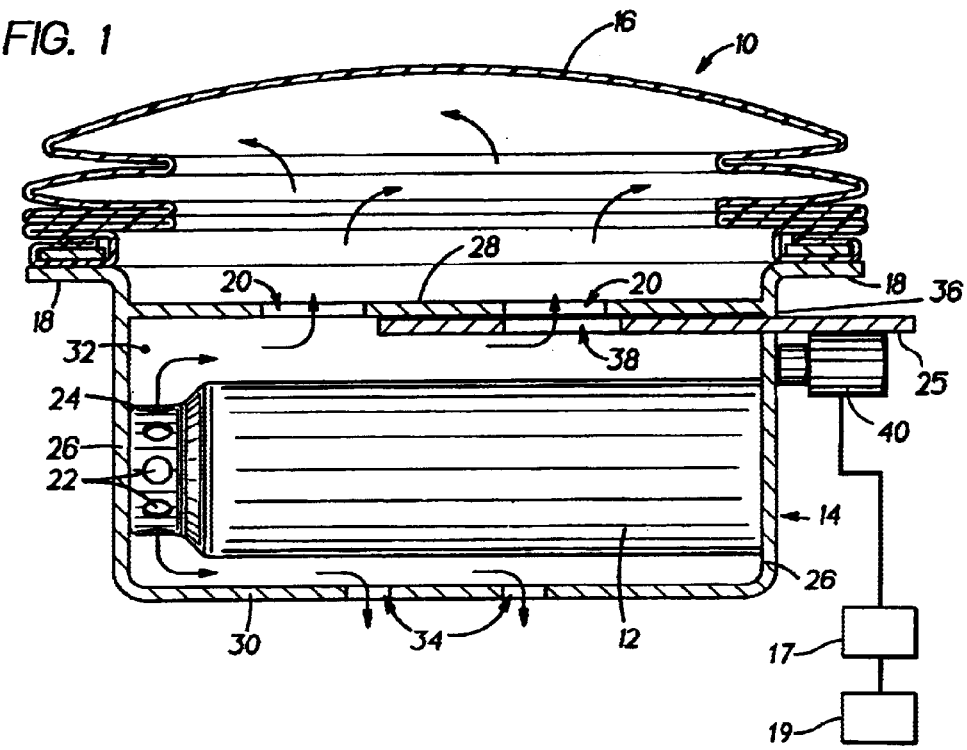
FIG. 1 is a sectional side view of a passenger's side air bag module embodying the present invention shown during full deployment of an air bag cushion.

Referring to FIG. 1, it is seen that an air bag module, generally designated 10, includes an inflator 12 for generating inflator gas upon the sensing of predetermined vehicle conditions, i.e. rapid deceleration. The air bag module 10 includes an air bag housing 14 for receiving the inflator 12. Au air bag cushion 16 is secured to a peripheral flange 18 disposed about the upper edge of the housing 14 in a folded position and mounted in a conventional manner within the occupant compartment, such as within the instrument panel. The inflator 12 shown is commonly used for an air bag module 10 installed in the passenger side of a vehicle to protect the occupants thereof. One skilled in the art, however, will recognize that the air bag module 10 described hereinafter may be used for other passive restraints, i.e., driver side air bag modules and side impact air bag modules.

Upon actuation of the inflator 12 in response to fast deceleration of a motor vehicle, heated gas passes from the inflator through openings 20 disposed in the housing 14 to inflate the air bag cushion 16. The inflator releases a predetermined volume of heated gas in response to the sensed deceleration of the vehicle. The output inflation of the inflator is sufficient to fully deploy or inflate the air bag cushion 16.

A controller 17, e.g. a sensing and actuating system, generates an ignition signal to the inflator 12 in response to velocity responsive sensors 19 mounted on the vehicle bumper and/or acceleration, or inertia responsive sensors mounted on a part of the vehicle occupant compartment, such as the fire wall. In response to the sensed signals, the controller provides an ignition signal to the inflator 12 to initiate deployment inflation of the air bag cushion in accordance with a predetermined level of deceleration. In response to the ignition signals, the inflator releases an appropriate predetermined volume of gas into the air bag cushion 16 through vent ports 22 of a diffuser 24. The level of deployment or inflation of the air bag cushion 16 is dependent on the actuation of a slide 25 slidably arranged to selectively block the openings 20 of the air bag housing 14 to restrict gas flow to the air bag cushion, as will be described hereinafter.

As shown in FIG. 1, the air bag housing 14 is generally rectangular shaped having side walls 26, a top wall 28 and a bottom wall 30, which define an inflation chamber 32 for receiving the inflator 12. The top wall 28 includes a pair of rows of openings 20 for passing the gas from the inflator 12 to the air bag cushion 16. The openings 20 may have any shape provided the total cross-sectional area of the openings is sufficient to inflate the air bag cushion 16 to full deployment in the specified time period. The bottom wall 30 also includes a plurality of aspiration or venting apertures 34 to provide an alternate path for passing the inflating gas from the housing and away from the air bag cushion. The total cross-sectional area of venting apertures 34 is less than that of the openings 20 disposed in the top wall 28. One skilled in the art will appreciate that the venting apertures 34 may be disposed on any wall of the housing, i.e., the side walls, provided the inflation gas passing therethrough is directed away from inflating the air bag cushion 16.

The slide 25 extends within the chamber 32 of the air bag housing 14 through a slot 36 disposed in a side wall 26 adjacent the top wall 28 of the housing. The slide is movably mounted to the housing to allow lateral movement along the inner surface of the top wall 28. The slide 25 includes a row of complementary openings 38 of similar shape and size as the row of openings 20 disposed in the top wall 28. The complementary openings 38 are disposed on the slide 25 such that in a full deployment position (as shown in FIG. 1) the openings 20, 38 are in registered relation to prevent or limit gas flow resistance to the inflation of the air bag cushion 16. The complementary openings 38 may be slightly larger than the openings 20 of the top wall 28 to ensure unrestrained gas flow to the air bag cushion 16 during full level deployment. The slide 25 is moved laterally along the inner surface of the top wall 28 by a pyrotechnic actuator 40. One skilled in the art will appreciate that the actuator 40 may be any device that can move the slide 25, such as a solenoid. The slide 25 extends sufficiently to restrict, or even block, the gas flow through the openings 20 of the top wall 28 in the reduced level of deployment, as shown in FIGS. 2 and 3 respectively.

In the operation of the air bag module 10, the default or initial position of the slide 25 may be disposed in the opening position as shown in FIG. 1 wherein the openings 38 of the slide are disposed in registered relation with the openings 20 of the top wall 28. Upon actuation of the air bag module 10 under full deployment conditions, the actuator 40 is not initiated to permit unrestricted gas flow to the air bag cushion 16. Most of the gas released from the inflator 12 flows to the air bag cushion 16 with some gas passing through the venting apertures 34 because the cross sectional area of the openings 20 is substantially greater than the area of the venting apertures 34.

Upon actuation of the air bag module 10 under reduced deployment conditions, the controller 17, 19 fires pyrotechnic actuator 40 which moves the slide 25 inwardly a predetermined distance to cover a portion of the openings 20 of the top wall 28 of the housing 14 to limit gas flow into the air bag cushion 16. The restriction of the openings 20 of the top wall 28 forces more gas released from the inflator through the venting apertures 34, and thereby inflating the air bag cushion 16 at a reduced level.

Figure 2:
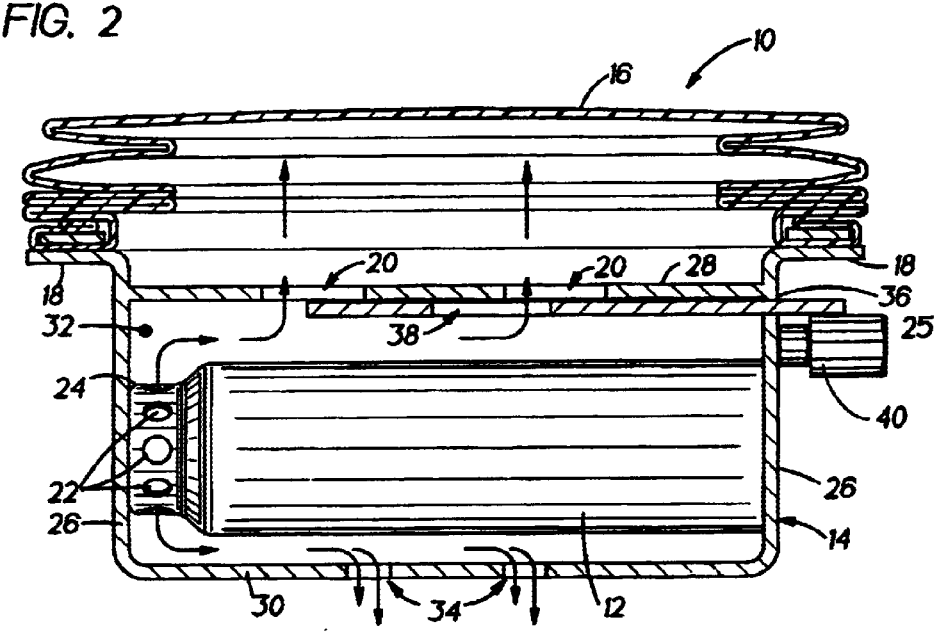
FIG. 2 is a sectional view of the passenger's side air bag module of FIG. 1 shown during reduced deployment of the air bag cushion.
Figure 3:
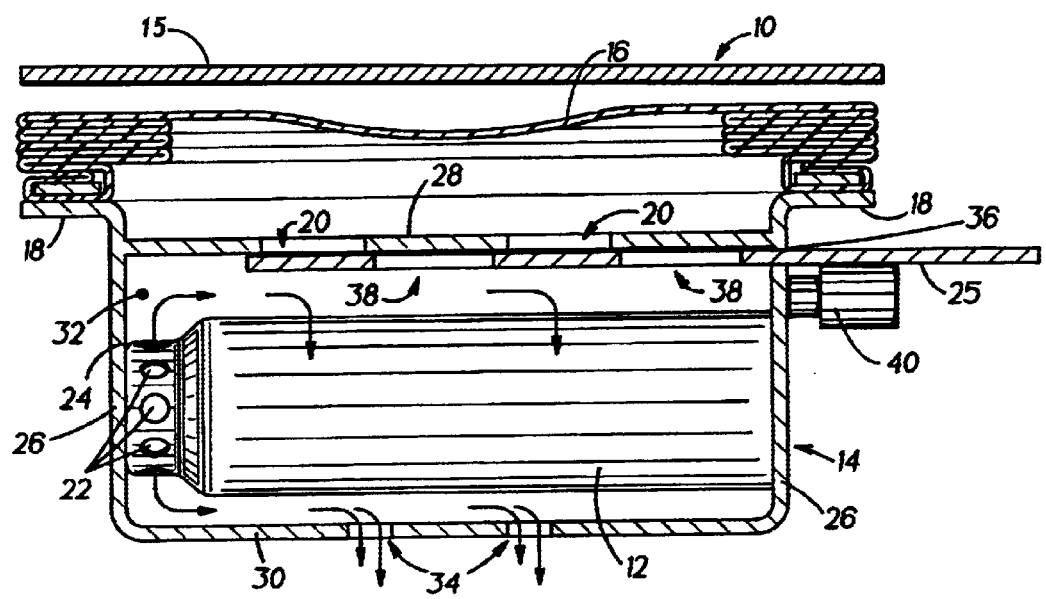
FIG. 3 is a sectional view of the passenger's side air bag module of FIG. 1 shown during no deployment of the air bag cushion.

One skilled in the art will appreciate that the default position of the slide 25 may be in the restricted position as shown in FIG. 2, wherein the pyrotechnic actuator 40 is not ignited under reduced level deployment conditions. During full level deployment condition, the pyrotechnic actuator 40 is ignited to move the slide outwardly from the housing 14 to the open, unrestricted position as shown in FIG. 1.

Under some circumstances, it may be desirous that gas flow to the air bag cushion 16 be blocked to prevent gas from inflating the air bag cushion 16 as shown in FIG. 3. In this closed position, the slide 25 is disposed such that the slide covers the openings 20 of the top wall 28. The gas released from the inflator 12 exits the housing 14 through the venting apertures 34. In the open position the slide 25 will be moved inwardly a predetermined distance by the pyrotechnic actuator 40 to align the complementary openings 38 of the slide and the openings 20 of the top wall 28 of the housing 14. Again it will be understood that the closed position of the slide 25 may be its default position or final position after ignition of the pyrotechnic actuator 40.

The air bag module 10 in FIG. 3 also illustrates an alternative embodiment of the slide 25. The slide includes a pair of rows of openings 38 that when aligned in registered relation with the openings 20 of the top wall 28 provides unrestricted gas flow from the housing 14 to the air bag cushion 16.

In FIGS. 4 and 5, an alternative embodiment 50 of the air bag module 10 of FIGS. 1 and 2 is illustrated which is substantially the same with like components having like reference numerals. The slide 52 of the alternative embodiment 50 is substantially similar to the slide 25 of FIG. 1, except the slide is moveably mounted to the housing 14 to allow lateral movement along the inner surface of the bottom wall 30. The slide 52 includes a row of complementary apertures 60 of similar shape and size as a row of venting apertures 34 disposed in the bottom wall 30. The complementary apertures 60 are disposed on the lower slide 52 such that in a full level deployment position (as shown in FIG. 4) the slide 52 closes (or restricts) the venting apertures 34 to prevent gas flow from passing therethrough and redirects the gas flow to the air bag cushion 16. In the reduced or blocked level of deployment, the apertures 34, 60 are in registered relation to prevent or limit gas flow resistance from the air bag housing away from the air bag cushion 16. The complementary apertures 60 may be slightly larger than the venting apertures 34 of the bottom wall 30 to ensure unrestrained gas flow from the housing 14.

The slide 52 is moved along the inner surface of the bottom wall 30 by a pyrotechnic actuator 40, as described hereinbefore. Further, the slide 52 extends laterally about the venting apertures 34 sufficiently to block or restrict, the gas flow through the venting apertures of the bottom wall 30 as shown in FIG. 4.

In the operation of the air bag module 50, the default or initial position of the slide 52 may be disposed in the closed position as shown in FIG. 4 wherein slide 52 closes the venting apertures 34 of the housing 14. Upon actuation of the air bag module 50 under full level deployment conditions, the actuator 40 is not initiated and slide 52 blocks gas flow from exiting the air bag housing 14 through the bottom wall 30, and thereby gas flow is directed to the air bag cushion 16.

Upon actuation of the air bag module 50 under reduced level deployment conditions, the controller fires the pyrotechnic actuator 40 which moves the slide 52 inwardly a predetermined distance (FIG. 5) so that apertures 60 of slide 52 move in registry with venting apertures 34 of the bottom wall 30. The cross-sectional area of the openings 34 is proportional to the cross sectional area of the openings 20 of the top wall 28 to draw a predetermined volume of gas away from the housing 14 to inflate the air bag cushion 16 at a reduced level of inflation.

One skilled in the art will appreciate that the default position of the slide 52 may be in the open position as shown in FIG. 5, wherein the pyrotechnic actuator 40 is not ignited under low level deployment conditions. During full level deployment condition, the pyrotechnic actuator 40 is ignited to move the slide 52 outwardly from the housing 14 to a closed position as shown in FIG. 4.

Figure 6:
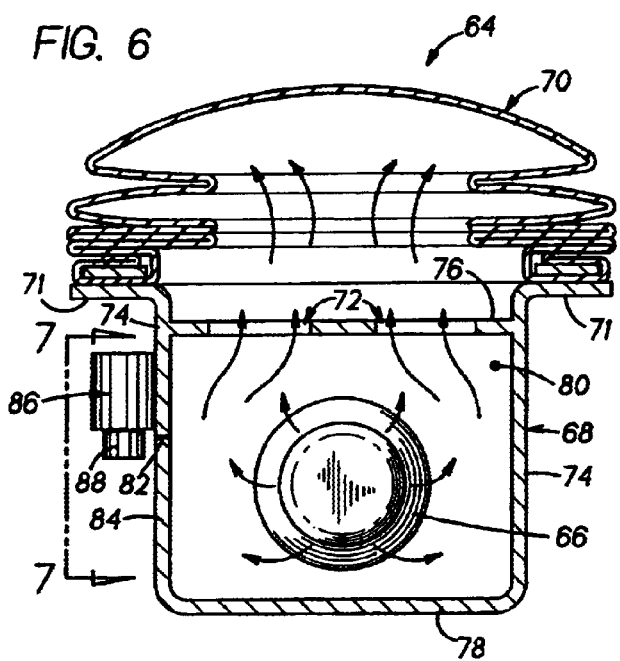
FIG. 6 is a sectional view of another alternative embodiment of a passenger's side air bag module embodying the present invention shown during full deployment of an air bag cushion.

In another embodiment shown in FIG. 6, an air bag module 64 includes an inflator 66 for generating inflator gas upon the sensing of predetermined vehicle conditions. The air bag module 64 includes an air bag housing 68 for receiving the inflator. An air bag cushion 70 is secured to a peripheral flange 71 disposed about the upper edge of the housing 68.

Upon actuation of the inflator 66 in response to fast deceleration of a motor vehicle, heated gas passes from the inflator through openings 72 disposed in the housing 68 to inflate the air bag cushion 70. The inflator 66 releases a predetermined volume of heated gas in response to the sensed deceleration of the vehicle. The output inflation of the inflator is sufficient to fully deploy or inflate the air bag cushion 70.

Figure 9:
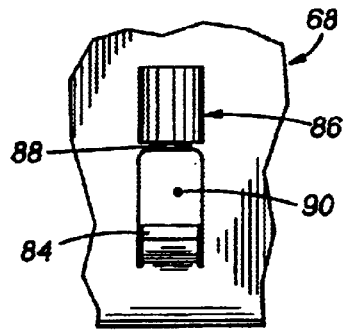
FIG. 9 is a side elevational view of the slide assembly and flap of the passenger's side air bag module of FIG. 8 shown during reduced deployment of the air bag cushion taken along line 9—9.

As shown in FIG. 6, the air bag housing 68 is generally rectangular shaped having side walls 74, a top wall 76 and a bottom wall 78, which define an inflation chamber 80 for receiving the inflator 66. The top wall 76 includes a pair of rows of openings 72 for passing the gas released from the inflator 66 to the air bag cushion 70. The openings 72 may have any shape provided the total cross-sectional area of the openings is sufficient to inflate the air bag cushion 70 to full deployment in the specified time period. A side wall 74 also includes a generally U-shaped cutout 82 to form a deformable flap 84 as best shown in FIG. 9. The flap 84 opens during low level deployment of the air bag cushion 70 to thereby provide an alternate path for diverting the inflating gas away from the air bag cushion during reduced level of inflation. One skilled in the art will appreciate that the flap 84 may be disposed on other walls of the housing, i.e., side and bottom walls, provided the inflation gas passing therethrough is directed away from inflating the air bag cushion 70.

The air bag module 64 further includes a pyrotechnic actuator or solenoid 86 mount to the outer surface of the side wall 74, adjacent the flap 84. The actuator 86 includes a plunger 88 that when actuated the plunger extends downwardly to extend over the flap 84 to prevent opening of the flap during full level deployment of the air bag cushion 70. One skilled in the art will appreciate that the initial state of the plunger 88 may be extended and that actuation of the actuator 86 retracts the plunger to permit the flap to open during reduced level deployment of the air bag cushion 16.

Figure 7:
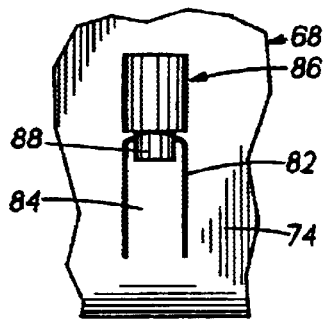
FIG. 7 is a side elevational view of the slide assembly and flap of the passenger's side air bag module of FIG. 6 shown during full deployment of the air bag cushion taken along line 7—7.

FIGS. 6 and 7 illustrate the air bag module 64 under full level deployment of the air bag cushion 70. The pyrotechnic actuator 86 is shown in a default state, wherein the plunger 88 is extended to prevent the opening of the flap 84. Under full level deployment, the inflator 66 is ignited releasing gas therefrom. The actuator 86 is not actuated to therefore prevent the opening of the flap 84. The gas therefore passes through the openings 72 of the top wall 76 of the air bag housing 68 to fully inflate air bag cushion 70.

Figure 8:
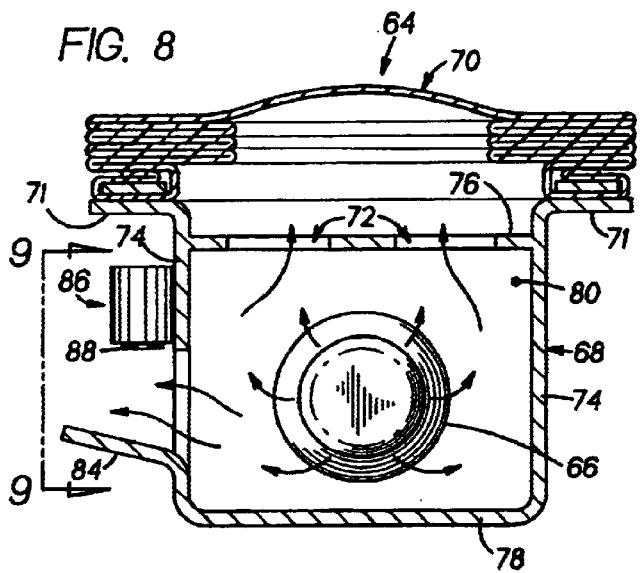
FIG. 8 is a sectional view of the passenger's side air bag module of FIG. 6 shown during reduced deployment of the air bag cushion.

FIGS. 8 and 9 illustrate the air bag module 64 under reduced level deployment of the air bag cushion 70. Under reduced level deployment, the inflator 66 is ignited releasing the gas therefrom. In addition, the actuator 86 is activated to retract the plunger 88 as shown in FIG. 9. The force generated by the exiting gas from the inflator 66 deforms the flap 84 bending the flap away from side wall 74. The cross-sectional area of the opening 90 created by the bending of the flap is proportional to the cross sectional area of the openings 72 of the top wall 76 to draw a predetermined volume of gas away from the housing 68 to inflate the air bag cushion 70 at a reduced level of inflation.

One skilled in the art will appreciate that the default position of the pyrotechnic actuator 86 may be in the retracted position as shown in FIGS. 8 and 9, wherein the pyrotechnic actuator is not ignited under low level conditions. During full level deployment condition, the pyrotechnic actuator is ignited to extend the plunger 88 to prevent the opening of the flap 84 as shown in FIGS. 6 and 7.

While the slides 25, 52, shown in the embodiments of FIGS. 1 and 4 respectively, are described as moving linearly to increase or reduce the level of inflation of the air bag cushion, one will appreciate that the slides may also pivot or rotate to control the level of inflation.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag module, comprising:
   a housing having a bottom wall and side walls defining a chamber, said housing having a vent aperture in the bottom wall providing fluid communication between the chamber and exterior of the air bag module;
   an air bag cushion secured to the housing, wherein the air bag cushion is in fluid communication with the chamber trough a plurality of first openings disposed in the housing;
   an inflator disposed in the housing for releasing gnu to inflate the air bag cushion in response to one of first and second deployment conditions;
   a slide engaging to housing adjacent the plurality of first openings, the slide being configured to move from a first position to a second position in response to the first deployment condition, wherein the first position permits a first predetermined level of fluid communication between said chamber and air bag cushion and the second position permits a second predetermined level of fluid communication between the chamber and air bag cushion, the first predetermined level being different than the second predetermined level, said vent aperture remaining unobstructed as said slide moves from said first position to said second position.

2. The air bag module as in claim 1, wherein the first predetermined level of fluid communication is greater than the second predetermined level of fluid communication.

3. The air bag module as in claim 2, wherein the slide restricts fluid flow between the chamber and the sir bag cushion in the second position.

4. The air bag module as in claim 2, wherein the slide blocks fluid flow between the chamber and the air bag cushion in the second position.

5. The air bag module as in claim 1, wherein each of the plurality of first openings has a cross sectional area greater than a cross sectional area of the vent aperture.

6. The air bag module as in claim 1, wherein the slide has a plurality of second openings.

7. The air bag module as in claim 6, wherein the plurality of first and second openings are aligned to provide unrestricted fluid flow between the chamber and to air bag cushion when the slide is in the second position.

8. The air bag module as in claim 6, wherein the second openings have a total cross sectional area that is greater tan a total cross sectional area of the first openings.

9. An air bag module, comprising:
   a housing having a bottom wall and side walls defining a chamber, said housing having at least one vent aperture positioned to provide selective fluid communication between the chamber and the exterior of the housing;
   an air bag cushion secured to the housing, wherein the air bag cushion is in fluid communication with the chamber through first openings disposed in the housing;
   an inflator disposed in the chamber for releasing gas to inflate the air bag cushion in response to one of first and second deployment conditions; and
   a slide extending through one of the side walls and being movably mounted to said housing proximate to said at least one vent aperture, said slide provides a first level of fluid communication between only the chamber and the exterior of the housing under the first deployment condition, and provides a second level of fluid communication between only the chamber and the exterior of the housing under the second deployment condition, wherein said first openings remain unobstructed by said slide under both the first and second deployment conditions.

10. The air bag module as in claim 9, wherein the first level of fluid communication is greater than the second level of fluid communication.

11. The air bag module as in claim 9, wherein the slide is adapted to move from a first position to a second position in response to the first deployment condition, wherein the first position permits a first predetermined level of fluid communication between the chamber and the exterior of the housing and wherein the second position permits a second predetermined level of fluid communication between the chamber and the exterior of the housing, the first predetermined level of fluid communication being different than the second predetermined level of fluid communication.

12. The air bag module as in claim 11, wherein the slide restricts fluid flow between the chamber and the exterior of the housing in the second position.

13. The air bag module as in claim 11, wherein the slide has at least one opening configured to align with the at least one vent aperture to provide unrestricted fluid flow between the chamber and the exterior of the housing in the first position.

14. The air bag module as in claim 9, wherein the slide is configured to have at least one opening for aligning with said at least one vent aperture under the first deployment condition.

15. The air bag module as in claim 9, wherein each of the first openings has a cross sectional area greater than a cross sectional area of the vent aperture.

16. A method for variably inflating an air bag cushion, comprising:
   providing an air bag module including a housing having a bottom wall sand side walls defining a chamber, a vent aperture in the bottom wall providing fluid communication between the chamber of the housing and exterior of the air bag module and openings providing fluid communication between the chamber of the housing and the air bag cushion;

actuating an inflator disposed in the housing for releasing gas to inflate the air bag cushion in response to one of first and second deployment conditions; and moving a slide that extends through on of the side walls from a first position to a second position in response to the first deployment condition, wherein the first position permits a first predetermined level of fluid communication between said chamber and air bag cushion and the second position permits a second predetermined level of fluid communication between the chamber and air bag cushion, the first predetermined level being different than the second predetermined level, wherein the slide adjusts between the first and second predetermined levels of fluid communication by opening or closing only the vent aperture or only the openings.

17. A meted for variably inflating an air hag cushion, comprising:

providing an air bag module including a housing having a bottom wall and side walls defining a chamber, a vent aperture providing selective fluid communication between the chamber of the housing and exterior of the housing and openings providing fluid communication between the chamber of the housing and the air bag cushion;

actuating an inflator disposed in the housing for relearning gas to inflate the air bag cushion in response to one of first and second deployment conditions; and moving a slide that extends through one of the side walls from a first position to a second position in response to the first deployment condition to selectively open to vent aperture, wherein the first position permits a first predetermined level of fluid communication between said chamber and the exterior of the housing and the second position permits a second predetermined level of fluid communication between the chamber and the exterior of the housing, the first predetermined level being different than the second predetermined level, wherein the openings remain unobstructed when the slide is in the first and second positions.

18. The method as in claim 17, wherein moving the slide from the second position to the first position selectively closes the vent aperture to restrict fluid communication through the vent aperture.

19. A device for variably inflating an air bag, comprising:

a) a housing having a bottom wall and side walls defining an interior volume, said housing baying a vent aperture in the bottom wall providing fluid communication between said interior volume and an exterior of said housing;

b) an inflatable air bag being secured to maid housing, said air bag being in fluid communication with said interior volume through a plurality of openings in said housing;

c) an inflator for releasing gas into said interior volume; and d) a fluid flow restriction member extending through one of the side walls and being movably mounted to said housing for movement between a first position and a second position, said fluid flow restriction member only restricts fluid flow from said interior volume to one of said air bag and said exterior as said fluid flow restriction member moves from said first position to said second position by closing either said vent aperture or said plurality of openings.

20. A device as in claim 19, wherein said fluid flow restriction member has a plurality of openings, said plurality of openings in said fluid flow restriction member being configured, dimensioned and positioned to align with said plurality of openings in said housing when said fluid flow restriction member is in said first position.

21. A device as in claim 19, wherein said fluid flow restriction member is moved between said first position and said second position in response to a signal received from a controller.

22. A device as in claim 21, wherein said controller determines the level of deployment of said air bag.

23. An air bag module, comprising:

a housing having a bottom wall and side walls defining an interior volume, said housing having a plurality of vent apertures in the bottom wall providing fluid communication between said interior volume and an exterior of said housing;

an inflatable air bag being secured to said housing, said inflatable air bag being in fluid communication with said interior volume through a plurality of inflation openings in said housing;

an inflator for releasing gas into said interior volume;

a fluid flow restriction member extending through one of the side walls and being movably mounted to said housing for movement between a first position and a second position, said fluid flow restriction member only restricts fluid flow from said interior volume to one of said air bag and said exterior as said fluid flow restriction member moves from said first position to said second position such that either said vent apertures or said plurality of inflation openings remain unobstructed by said fluid flow restriction member when said fluid flow restriction member is in both the first and second positions.

24. The air bag module as in claim 23, wherein said fluid flow restriction member has a plurality of fluid flow openings, said plurality of fluid flow openings aligning with said plurality of inflation openings when said fluid flow restriction member is in said first position.

25. The air bag module as in claim 24, wherein the number of said plurality of fluid flow openings equals the number of said plurality of inflation openings.

26. An air bag module, comprising:

a housing having a bottom wall and side walls defining a chamber in fluid communication with an exterior of said housing through at least one vent aperture formed in the bottom wall;

an air bag secured to the housing, wherein said air bag is in fluid communication wit said chamber through at least one diffuser opening;

an inflator being configured to release an inflation gas into said chamber to inflate said air bag in response to a first deployment condition or a second deployment condition; and a slide member extending through one of the side walls into said chamber for movement between a first position and a second position, said slide member being moved from said first position to said second position under said first deployment condition to either restrict flow of a portion of said inflation gas from said chamber to said air bag trough said at least one diffuser opening without restricting flow of said inflation gas from said chamber to said exterior trough said at least one vent aperture, or to restrict flow of said portion from said chamber to said exterior through said at least one vent aperture without restricting flow of said inflation gas from said chamber to said air bag trough said at least one diffuser opening.

27. The air bag module as in claim 26, wherein said slide member is configured for movement with respect to said at least one vent aperture, said first position being configured to allow flow of said portion from said chamber to said exterior through said at least one vent aperture, and said second position being configured to restrict flow of said portion from said chamber to said exterior by covering said at least one vent aperture.

28. The air bag module as in claim 27, wherein said slide member comprises:

at least one fluid flow opening aligning with said at least one vent aperture when said slide member is in said first position.

29. The air bag module as in claims 28, wherein said at least one fluid flow opening has a total cross sectional area that is greater than a total cross sectional area of said at least one vent aperture.

30. The air bag module as in claim 26, wherein said slide member is configured for movement with respect to said at least one diffuser opening, said first position being configured to allow flaw of said portion from said chamber to said air bag through maid diffuser opening, and said second position being configured to restrict flow of said portion from said chamber to said air bag by covering said at least one diffuser opening.

31. The air bag module as in claim 30, wherein said slide member comprises:

at least one fluid flow opening aligning with said at least one diffuser opening when said slide member is in said first position.

32. The air bag module as in claim 31, wherein said at least one fluid flow opening has a total cross sectional area that is greater than a total cross sectional area of said at least one diffuser opening.

33. The air bag module as in claim 26, wherein said slide member is configured to move laterally between said first position and said second position along an inner surface of a wall of said housing.

34. The air bag module as in claim 26, wherein a total cross sectional area of said at least one vent aperture is less than a total cross sectional area of said at least one diffuser opening.

35. The sir bag module as in claim 34, wherein either said first position is an initial position of said slide member, or said second position is said initial position of said slide member.

36. The air bag module as in claim 35, wherein a level of inflation of said air bag is dependant upon said first and second deployment conditions.

* * * * *